US010435056B2

(12) United States Patent
Tolles, Sr.

(10) Patent No.: US 10,435,056 B2
(45) Date of Patent: Oct. 8, 2019

(54) DOLLY CART RAIL AND LOCK SYSTEM

(71) Applicant: JDI Services, Inc., Oregon, OH (US)

(72) Inventor: Jeffrey R. Tolles, Sr., Martin, OH (US)

(73) Assignee: JDI Services, Inc., Oregon, OH (US)

( * ) Notice: Subject to any disclaimer, the term of this patent is extended or adjusted under 35 U.S.C. 154(b) by 0 days.

(21) Appl. No.: 15/898,926

(22) Filed: Feb. 19, 2018

(65) Prior Publication Data
US 2018/0237047 A1 Aug. 23, 2018

Related U.S. Application Data

(60) Provisional application No. 62/461,570, filed on Feb. 21, 2017.

(51) Int. Cl.
*B62B 3/04* (2006.01)
*B62B 3/10* (2006.01)

(52) U.S. Cl.
CPC ............... *B62B 3/04* (2013.01); *B62B 3/10* (2013.01); *B62B 2203/74* (2013.01); *B62B 2207/00* (2013.01)

(58) Field of Classification Search
CPC ......... B62B 3/04; B62B 3/10; B62B 2207/00; B62B 2203/74
See application file for complete search history.

(56) References Cited

U.S. PATENT DOCUMENTS

| | | | | |
|---|---|---|---|---|
| 4,200,046 A | * | 4/1980 | Koliba | B60P 7/0892 410/94 |
| 4,217,831 A | * | 8/1980 | Koliba | B60P 7/0892 410/121 |
| 4,502,628 A | * | 3/1985 | Sarantitis | E01B 5/02 16/102 |
| 4,545,303 A | * | 10/1985 | Fujita | E01B 25/24 104/110 |
| 4,674,929 A | * | 6/1987 | Blunden | B60P 3/08 188/36 |
| 4,679,974 A | * | 7/1987 | Blunden | B60P 3/077 188/36 |
| 4,702,174 A | * | 10/1987 | Tredwell | B61B 10/04 104/172.2 |
| 4,979,856 A | * | 12/1990 | Blunden | B60P 3/077 410/30 |
| 5,167,479 A | * | 12/1992 | Bott | B01D 53/485 224/42.33 |
| 5,205,515 A | * | 4/1993 | Luria | B64D 11/0007 186/40 |

(Continued)

*Primary Examiner* — Jacob B Meyer
(74) *Attorney, Agent, or Firm* — MacMillan, Sobanski & Todd, LLC

(57) ABSTRACT

A dolly cart rail and lock system configured to secure one or more dolly carts within a vehicle is provided. The dolly cart rail and lock system includes a first upper rail connected to a platform of the vehicle. The first upper rail having a first end. A second upper rail opposes the first upper rail and is connected to the platform of the vehicle. The second upper rail has a first end. A bulkhead assembly connects the first end of the first upper rail and the first end of the second upper rail. A plurality of spaced apart pocket assemblies is attached to the first and second upper rails. At least one lock assembly is connected to the pocket assemblies and is configured to engage the dolly carts such as to limit movement of the dolly carts in a front-to-back direction.

20 Claims, 7 Drawing Sheets

(56) References Cited

U.S. PATENT DOCUMENTS

| | | | |
|---|---|---|---|
| 5,224,812 A | 7/1993 | Oslin et al. | |
| 5,249,905 A * | 10/1993 | Warner | B65G 69/005 410/30 |
| 6,092,970 A * | 7/2000 | Hahn | B65G 69/005 188/32 |
| 6,099,220 A * | 8/2000 | Poth | B60P 7/08 410/121 |
| 6,435,421 B1 * | 8/2002 | Peterson | E01B 23/02 238/10 R |
| 6,477,962 B2 * | 11/2002 | Trujillo | B64D 11/0007 104/140 |
| 6,524,043 B2 * | 2/2003 | Earle | B60P 7/14 410/121 |
| 6,524,053 B2 * | 2/2003 | Hahn | B65G 69/005 414/401 |
| 6,561,103 B2 | 5/2003 | Peck | |
| 6,863,481 B2 * | 3/2005 | Pingel | B60P 3/077 224/924 |
| 7,453,358 B2 * | 11/2008 | Webster | B65G 19/02 104/172.3 |
| 8,459,515 B1 | 6/2013 | Weis | |
| 8,628,283 B1 * | 1/2014 | Flinn | A01C 15/003 111/200 |
| 2002/0108529 A1 * | 8/2002 | Trujillo | B64D 11/0007 104/165 |
| 2002/0141852 A1 * | 10/2002 | Hahn | B65G 69/005 414/401 |
| 2004/0202531 A1 | 10/2004 | Beransky et al. | |
| 2005/0067224 A1 * | 3/2005 | Brewster | E06C 7/44 182/108 |
| 2010/0010396 A1 * | 1/2010 | Branch | A61H 1/0281 601/5 |
| 2010/0178141 A1 * | 7/2010 | Wilson | B60P 3/07 414/373 |
| 2014/0033940 A1 | 2/2014 | Simpson et al. | |
| 2018/0237047 A1 * | 8/2018 | Tolles, Sr. | B62B 3/04 |

* cited by examiner

DOLLY CART RAIL AND LOCK SYSTEM

RELATED APPLICATIONS

This application claims the benefit of U.S. Provisional Application No. 62/461,570 filed Feb. 21, 2017, the disclosure of which is incorporated herein by reference in its entirety.

BACKGROUND

Parts, components and assemblies in varying stages of manufacture and assembly can be transported from one location to another location. The locations can include warehouses, manufacturing and assembly facilities. Often, the quantities of parts, components and assemblies being transported can result in heavy loads. Accordingly, it is known to use dolly carts for transporting parts, components and assemblies from one location to another location.

In the event, the locations are apart from each other, it is also known to position dolly carts loaded with parts, components and assemblies onto vehicles, such as the non-limiting example of semi-trailer trucks, for transport via roadways.

Within the trailer of the semi-trailer truck, the loaded dolly carts are typically secured to elements of the semi-trailer with straps, ratcheting tie-downs and the like. In the event the securing elements become loose or broken, the loaded dolly carts can become free to move within the semi-trailer, thereby potentially resulting in damage to the semi-trailer.

It would be advantageous if dolly carts could be secured within a vehicle in a more efficient manner.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the dolly cart rail and lock system.

The above objects as well as other objects not specifically enumerated are achieved by a dolly cart rail and lock system configured to secure one or more dolly carts within a vehicle. The dolly cart rail and lock system includes a first upper rail connected to a platform of the vehicle. The first upper rail having a first end. A second upper rail opposes the first upper rail and is connected to the platform of the vehicle. The second upper rail has a first end. A bulkhead assembly connects the first end of the first upper rail and the first end of the second upper rail. A plurality of spaced apart pocket assemblies is attached to the first and second upper rails. At least one lock assembly is connected to the pocket assemblies and is configured to engage the dolly carts such as to limit movement of the dolly carts in a front-to-back direction.

The above objects as well as other objects not specifically enumerated are also achieved by a vehicle equipped with a dolly cart rail and lock system configured to secure one or more dolly carts within the vehicle. The vehicle includes a platform configured to receive a plurality of movable dolly carts. The platform has a front end and a rear end. A first upper rail is connected to the platform and has a first end. A second upper rail opposes the first upper rail and is connected to the platform. The second upper rail has a first end. A bulkhead assembly connects the first end of the first upper rail and the first end of the second upper rail. A plurality of spaced apart pocket assemblies is attached to the first and second upper rails. At least one lock assembly is connected to the pocket assemblies and is configured to engage the dolly cart such as to limit movement of the dolly carts in a front-to-back direction.

Various aspects of the dolly cart rail and lock system will become apparent to those skilled in the art from the following detailed description, when read in light of the accompanying drawings.

DETAILED DESCRIPTION

Figure 1:
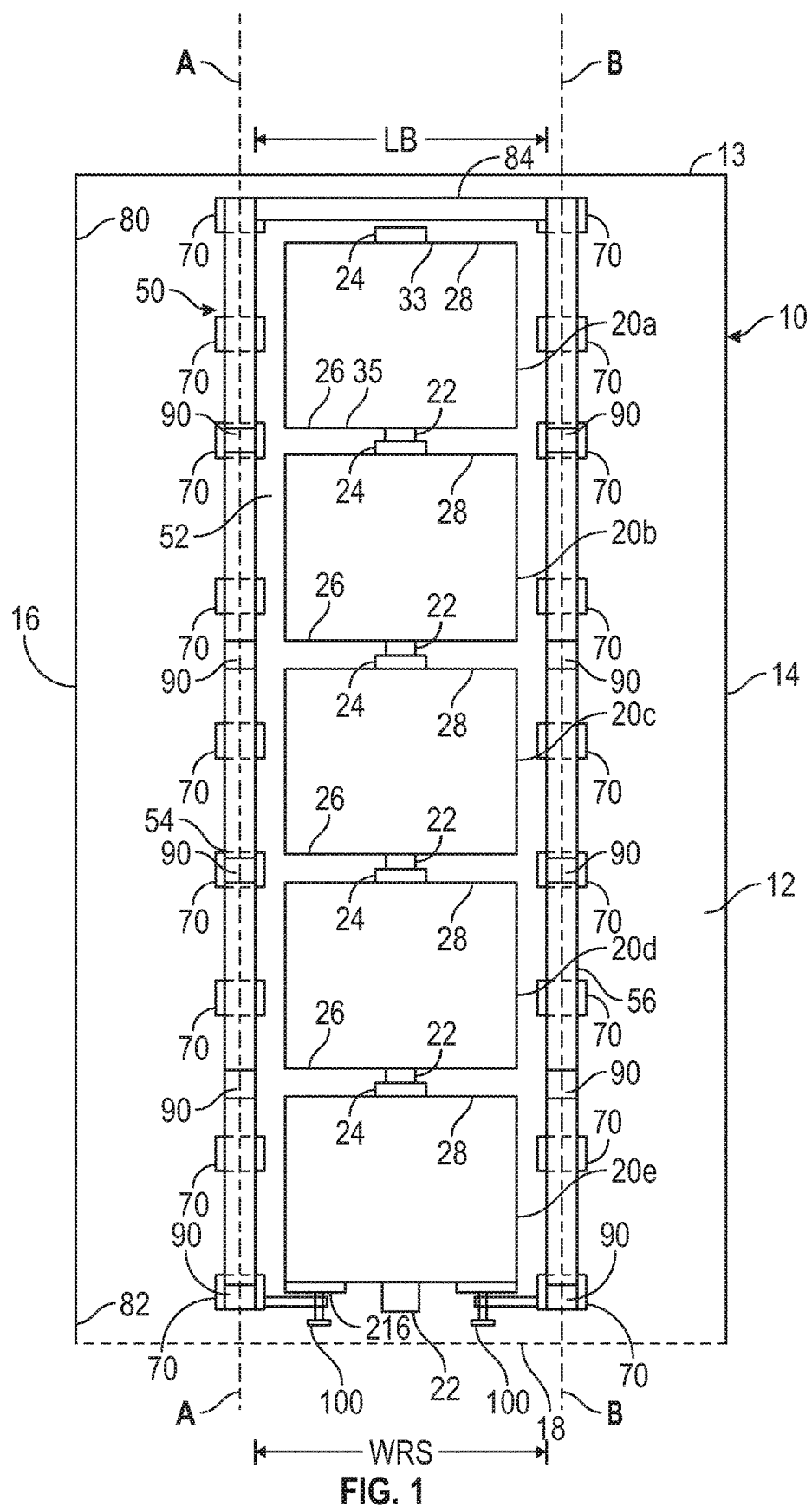
FIG. 1 is a plan view of a dolly cart rail and lock system according to the invention.

The dolly cart rail and lock system will now be described with occasional reference to the specific embodiments. The dolly cart rail and lock system may, however, be embodied in different forms and should not be construed as limited to the embodiments set forth herein. Rather, these embodiments are provided so that this disclosure will be thorough and complete, and will fully convey the scope of the dolly cart rail and lock system to those skilled in the art.

Unless otherwise defined, all technical and scientific terms used herein have the same meaning as commonly understood by one of ordinary skill in the art to which the dolly cart rail and lock system belongs. The terminology used in the description of the dolly cart rail and lock system herein is for describing particular embodiments only and is not intended to be limiting of the dolly cart rail and lock system. As used in the description of the dolly cart rail and lock system and the appended claims, the singular forms "a," "an," and "the" are intended to include the plural forms as well, unless the context clearly indicates otherwise.

Unless otherwise indicated, all numbers expressing quantities of dimensions such as length, width, height, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the dolly cart rail and lock system. Notwithstanding that the numerical ranges and parameters setting forth the broad scope of the dolly cart rail and lock system are approximations, the numerical values set forth in the specific examples are reported as precisely as possible. Any numerical values, however, inherently contain certain errors necessarily resulting from error found in their respective measurements.

The term "dolly cart", as used herein, is defined to mean any wheeled platform used to transport parts, components and assemblies from one location to another location portion.

Referring now to the drawings, there is illustrated a dolly cart rail and lock system. Generally, the dolly cart rail and lock system is configured to secure a dolly cart within a framework of rails disposed within a vehicle, such as the non-limiting example of a semi-trailer. The dolly cart is secured within the framework of rails such that movement is limited within a side-to-side direction and substantially prevented in a front-to-back direction.

Referring now to FIG. 1, a non-limiting example of a semi-trailer is illustrated generally at 10. The semi-trailer 10 includes a platform 12 bounded by a front wall 13, opposing sidewalls 14, 16 and a movable rear door system (shown schematically in phantom at 18). The semi-trailer 10 having the front wall 13, opposing sidewalls 14, 16 and rear door system 18 are conventional in the art. Optionally, the semi-trailer 10 can be fitted with a ceiling (not shown) extending between portions of the front wall 13, opposing sidewalls 14, 16 and rear door system 18. However, it should be appreciated that a ceiling is not required for operation of the dolly cart rail and lock system.

Referring again to FIG. 1, a plurality of dolly carts 20a-20e are positioned on the platform 12 of the semi-trailer 10 in a single line orientation. Each of the dolly carts 20a-20e includes a front hitch structure 22 and a rear hitch structure 24. The front hitch structures 22 are configured for insertion into the rear hitch structures 24 in a manner such that in an inserted arrangement, a front portion 26 of a dolly cart 20a-20e is coupled to a rear portion 28 of an adjacent dolly cart 20a-20e. In the coupled arrangement, the dolly carts 20a-20e form a train, and the resulting train of dolly carts 20a-20e can be moved by a moving device (not shown), such as the non-limiting example of a conventional tugger. In the illustrated embodiment, the front and rear hitch structures 22, 24 have the form of a pintle hook/ball hitch. However, in other embodiments, the front and rear hitch structures 22, 24 can have other forms sufficient to couple the front portion 26 of a dolly cart 20a-20e to a rear portion 28 of an adjacent dolly cart 20a-20e.

Figure 2:
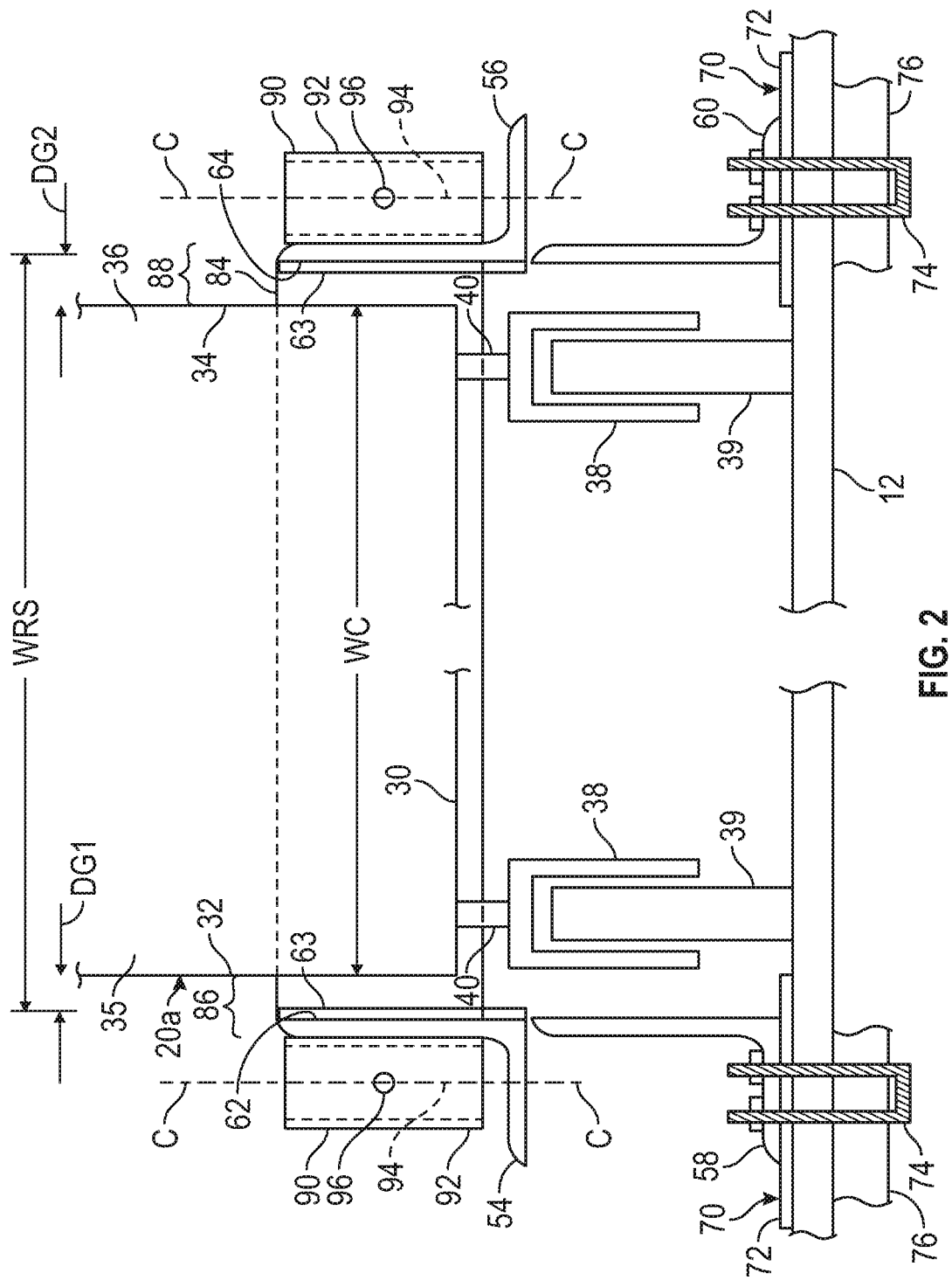
FIG. 2 rear view of the dolly cart rail and lock system of FIG. 1.

Referring now to FIGS. 1 and 2, a dolly cart 20a is illustrated. The dolly cart 20a is representative of the dolly carts 20b-20e. The dolly cart 20a is conventional in the art and will only be briefly described herein. The dolly cart 20a includes a platform 30 supported opposing sidewalls 32, 34. The dolly cart 20a also includes front and rear walls 33, 35. The platform 30, sidewalls 32, 34, front and rear walls 33, 35 define an interior cavity 36. The interior cavity 36 is configured to receive parts, components and assemblies (not shown) intended for transport as is known in the art.

Referring again to FIG. 2, the platform 30 of the dolly cart 20a is supported by a plurality of wheel assemblies 38. The wheel assemblies 38 are configured to facilitate rolling movement of the dolly cart 20a from one location to another location, such as the non-limiting example of rolling movement from a warehouse facility onto the semi-trailer 10 and subsequent rolling movement departing the semi-trailer 10. In the illustrated embodiment, the wheel assemblies 38 have the form of caster assemblies having a wheel 39 rotatably supported by a framework 40. Alternatively, the wheel assemblies 38 can be other structures, mechanisms and devices sufficient to facilitate rolling movement of the dolly cart 20a from one location to another location. The wheel 39 is in contact with the upper surface of the platform 12 of the semi-trailer 10.

Referring again to FIG. 2, the dolly cart 20a has a width WC. In the embodiment illustrated in FIG. 2, the width WC is in a range of from about 60.0 inches to about 100.0 inches. In alternate embodiments, the width WC of the dolly cart 20a can be less than about 60.0 inches or more than about 100.0 inches, sufficient to receive parts, components and assemblies intended for transport.

Referring now to FIGS. 1 and 2, a dolly cart rail and lock system (hereafter "rail system") is illustrated generally at 50. The rail system 50 is configured to define an interior compartment 52, within which the plurality of dolly carts 20as-20e are maintained during transport. The rail system 50 includes a first upper rail 54 and an opposing second upper rail 56. The first upper rail 54 is attached to a first lower rail 58 and the second upper rail 56 is attached to a second lower rail 60. In the illustrated embodiment, the first and second upper rails 54, 56 and the first and second lower rails 58, 60 are formed from angle iron having a thickness of 0.375 inches, a longer leg having a length of 7.0 inches and a shorter leg having a length of 4.0 inches. However, in other embodiments, the first and second upper rails 54, 56 and the first and second lower rails 58, 60 can be formed from structures sufficient to define an interior compartment 52, within which the plurality of dolly carts 20as-20e are maintained during transport.

Referring now to FIG. 2, the longer leg of the first upper rail 54 has an inner surface 62 and the longer leg of the second upper rail has an inner surface 64. The inner surfaces 62, 64 will be discussed in more detail below.

Referring again to the embodiment illustrated in FIG. 2, the first upper rail 54 is attached to the first lower rail 58 by welding the shorter leg of the first upper rail 54 to the longer leg of the first lower rail 58. In a similar manner, the second upper rail 56 is attached to the second lower rail 60 by welding the shorter leg of the second upper rail 56 to the longer leg of the second lower rail 60. In alternate embodiments, the first and second upper rails 54, 56 can be attached to the first and second lower rails 58, 60 by other methods and structures, including the non-limiting examples of brackets, clips and clamps.

Referring again to FIG. 1, in an installed position on the platform 12 of the semi-trailer 10, the assembled first upper and lower rails 54, 58 are centered along longitudinal axis A-A. In a similar manner in an installed position on the platform 12 of the semi-trailer 10, the assembled second upper and lower rails 56, 60 are centered along longitudinal axis B-B. In the illustrated embodiment, the axes A-A and B-B have a substantially parallel orientation. However, in other embodiments, the axes A-A and B-B can have non-parallel orientations.

Referring again to FIG. 2, the inner surface 62 of the longer leg of the first upper rail 54 has a substantially vertical orientation that aligns with the substantially vertical orientation of the sidewall 32 of the dolly cart 20a. In a similar manner, the inner surface 64 of the longer leg of the second upper rail 56 has a substantially vertical orientation that aligns with the substantially vertical orientation of the opposing sidewall 34 of the dolly cart 20a. As will be discussed in more detail below, the inner surfaces 62, 64 of the first and second upper rails 54 are configured to restrain side-to-side movement of the dolly carts 20a-20e.

Referring now to FIGS. 1 and 2, the first and second lower rails 58, 60 are supported by a plurality of spaced apart base assemblies 70 extending along the first and second lower rails 58, 60. Each base assembly 70 includes a support member 72 and a connection member 74. The support member 72 is configured to seat against the platform 12 and further configured to receive the connection member 74 through apertures (not shown) formed therethrough. In the illustrated embodiment, the support members 72 have the form of flat plates having dimensions of 8.0 inches by 10.0 inches and having a thickness of about 0.25 inches. However, in alternate embodiments, the support members 72 can have other forms, dimensions and thicknesses sufficient to seat against platform 12 and receive the connection member 74.

Referring now to FIG. 2, the connection members 74 have a "U" shape with the legs forming the "U" having threaded portions. The connection member 74 is configured to engage a structural member 76 of the semi-trailer 10, extend through the platform 12, support member 72 and the first or second lower rails 58, 60 and further configured to be secured with a plurality of threaded fasteners 78. In this manner the first and second lower rails 54, 58 are secured to the semi-trailer 10. While the embodiment illustrated in FIG. 2 shows the use of the connection members 74 to secure the first and second lower rails 54, 58 are secured to the semi-trailer 10, it should be appreciated that in other embodiments, the first and second lower rails 54, 58 can be secured to the semi-trailer 10 with other structures, mechanisms and devices.

Referring now to FIG. 1, the base assemblies 70 extend along the first and second lower rails 58, 60 in a spaced apart manner. In the illustrated embodiment, the base assemblies 70 are spaced apart by a distance in a range of from about 4.0 feet to about 6.0 feet. In other embodiments, the base assemblies 70 can be spaced apart by a distance of less than about 4.0 feet or more than about 6.0 feet, sufficient to support the rails 54, 56, 58, 60.

Referring now to FIG. 1, the platform 12 of the semi-trailer 10 includes a front end 80, positioned proximate to a tractor unit (not shown) and a rear end 82. A bulkhead assembly 84 spans the first upper rail 54 and the second upper rail 56 at the front end 80 of the platform 12. The bulkhead assembly 84 is configured for several functions. First, the bulkhead assembly 84 is configured to form a front portion of the rail system 50. Second, the bulkhead assembly 84 is configured form a connection between the first upper rail 54 and the second upper rail 56. Finally, the bulkhead assembly 84 having a length LB, is configured to establish a width WRS of the rail system 50. In the illustrated embodiment, the bulkhead assembly 84 is formed from a metallic channel having a major dimension in a range of from about 5.0 inches to about 8.0 inches and a thickness in a range of from about 0.125 inches to about 0.5 inches. In alternate embodiments, the bulkhead assembly 84 can have a major dimension of less than about 5.0 inches or more than about 8.0 inches and a thickness in a range of less than about 0.125 inches or more than about 0.5 inches, sufficient for the functions described herein.

In the illustrated embodiment, the bulkhead assembly 84 is connected to the first upper rail 54 and the second upper rail 56 with brackets (not shown) and mounting hardware (not shown). In alternate embodiments, the bulkhead assembly 84 can be connected to the first upper rail 54 and the second upper rail 56 with other structures, mechanisms, devices and in other manners, such as the non-limiting example as by welding.

Referring now to FIG. 2, a first gap 86 is formed between the inner surface 62 of the first upper rail 54 and the sidewall 32 of the dolly cart 20*a*. In a similar manner, a second gap 86 is formed between the inner surface 64 of the second upper rail 56 and the sidewall 34 of the dolly cart 20*a*. The first and second gaps 86, 88 are configured to provide a minimal clearance between the first and second upper rails 54, 56 and the sidewalls 32, 34 of the dolly cart 20*a*, thereby limiting movement of the dolly cart 20*a* in a side-to-side direction. In the illustrated embodiment, the first and second gaps 86, 88 have a width DG1, DG2 in a range of from about 0.5 inches to about 2.0 inches. However, in other embodiments, the first and second gaps 86, 88 can have widths DG1, DG2 less than about 0.5 inches or more than about 2.0 inches, sufficient to limit movement of the dolly cart 20*a* in a side-to-side direction.

Referring now to FIGS. 1 and 2 and as discussed above, the axes A-A and B-B have a substantially parallel orientation. Accordingly, the width WRS of the rail system 50 is constant from the front end 80 of the platform to the rear end 82 of the platform 82. The width WRS of the rail system 50 is formed from the width WC of the dolly cart 20 added to the widths DG1, DG2 of the first and second gaps 86, 88. In the embodiment illustrated in FIG. 2, the width WRS of the rail system 50 is in a range of from about 61.0 inches to about 102.0 inches. In alternate embodiments, the width WRS of the rail system 50 can be less than about 61.0 inches or more than about 102.0 inches, sufficient to limit movement of the dolly cart 20*a* in a side-to-side direction.

Referring now to FIG. 2, optionally the inner surface 62 of the first upper rail 54 can be fitted with a scuff rail 63, configured to extend the length of the first upper rail. The scuff rail 63 is configured to restrain side-to-side movement of the dolly carts 20*a*-20*e* and further configured to engage a sidewall 32 of a dolly cart 20*a*-20*e*. In the illustrated embodiment, the scuff rail 63 has the form of a sheet polymeric material. However, in other embodiments, the scuff rail 63 can have other desired forms and can be made from other desired materials, sufficient to engage a sidewall 32 of a dolly cart 20*a*-20*e*. However, it should be appreciated that the scuff rail 63 is optional and not required for operation of the dolly cart rail and lock system 50.

Figure 3:
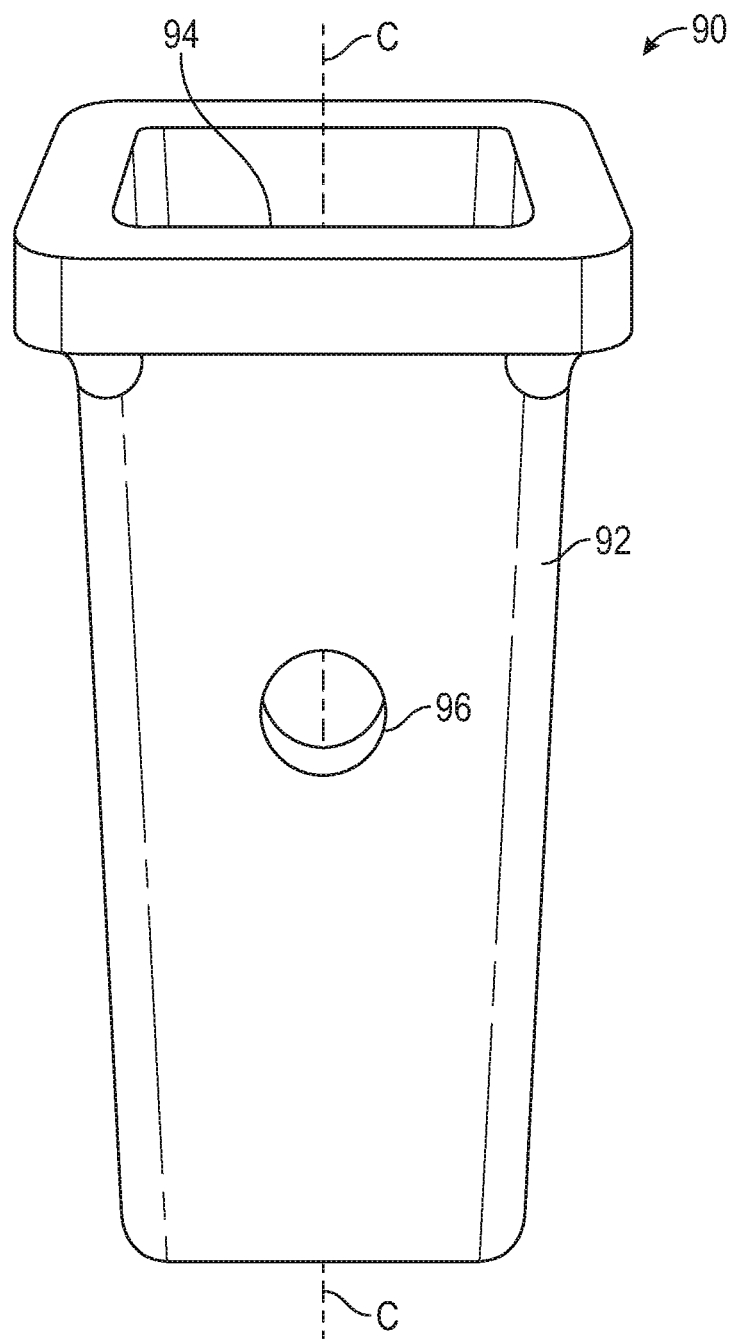
FIG. 3 is a perspective view of a pocket assembly of the dolly cart rail and lock system of FIG. 1.

Referring now to FIGS. 1, 2 and 3, a plurality of spaced apart pocket assemblies 90 are secured to the longer legs of the first and second upper rails 54, 56. Each pocket assembly 90 is a hollow structure having an outer wall 92. The outer wall 92 defines an interior cavity 94. The cavity 94 is centered about a longitudinal axes C-C. The tubular structure 92 also includes an aperture 96 extending though opposing sides. In the illustrated embodiment, the pocket assemblies 90 are secured to the longer legs of the first and second upper rails 54, 56 by welding. However, in other embodiments, the pocket assemblies 90 can be secured to the longer legs of the first and second upper rails 54, 56 with other methods and with structures, mechanisms, devices such as for example brackets and fastening hardware.

Referring again to the embodiment illustrated in FIGS. 1, 2 and 3, the pocket assembles 90 are formed from a metallic 2.25 inches by 2.25 inches square tube having a wall thickness of about 0.25 inches and have a length in a range of from about 4.0 inches to about 8.0 inches. However, in other embodiments, the pocket assemblies 90 can be formed from other materials and can have other dimensions sufficient for the functions described herein.

Referring now to FIG. 1, the pocket assemblies 90 are secured to the first and second upper rails 54, 56 at locations proximate to the front portion 26 of the dolly carts 20*a*-20*e*. The pocket assemblies 90 will be discussed in more detail below.

Figure 4:
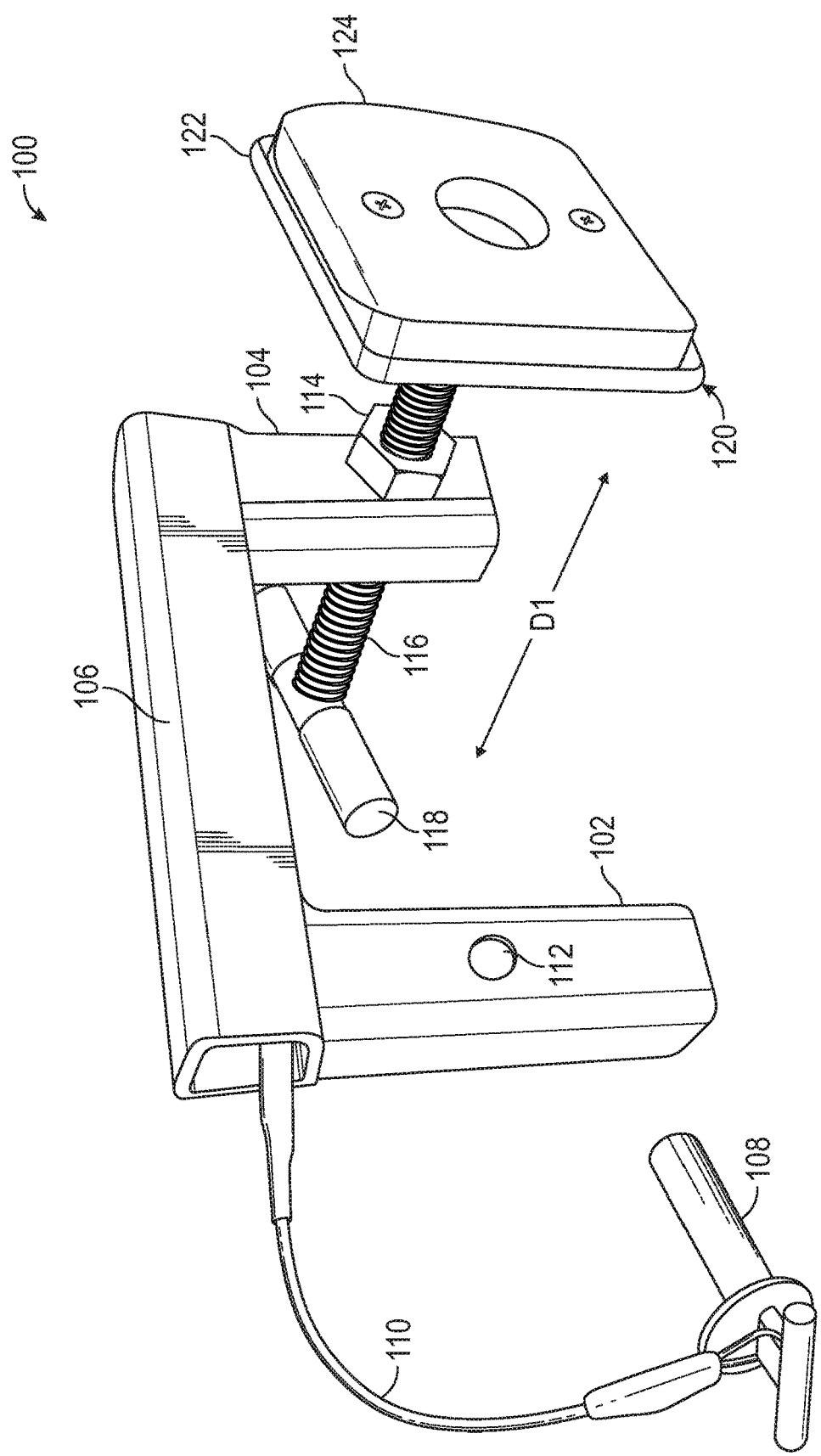
FIG. 4 is a perspective view of a lock assembly of the dolly cart rail and lock system of FIG. 1.

Referring now to FIG. 4, a lock assembly 100 is illustrated. The lock assembly 100 is configured for attachment to the rail system 50 and further configured to engage one of the dolly carts 20a-20e such as to limit front-to-back movement of all of the dolly carts 20a-20e. The lock assembly includes a first post 102 and a second post 104. The posts 102, 104 are connected to each other by an arm 106. In the illustrated embodiment, the first and second posts 102, 104 and the arm 106 are formed from a metallic 2.0 inches by 2.0 inch square tube having a wall thickness of about 0.25 inches and have a length in a range of from about 4.0 inches to about 8.0 inches. However, in other embodiments, the first and second posts 102, 104 and the arm 106 can be formed from other materials and can have other dimensions sufficient for the functions described herein.

Referring again to FIG. 4, a pin 108 is secured to the arm 106 by a flexible cable 110 such that the pin 108 is movable. As will be described in more detail below, the pin 108 is configured to removably couple the lock assembly 100 to the pocket assembly 100 of the rail system 50. In the illustrated embodiment, the pin 108 has the form of a detent pin. In other embodiments, the pin 108 can have other forms sufficient to removably couple the lock assembly 100 to the pocket assembly 100 of the rail system 50. In the illustrated embodiment, the flexible cable 110 has the form of aircraft cable having a diameter of about 0.125 inches. In other embodiments, the flexible cable 110 can have other forms sufficient to allow the pin 108 to be movable. It is also contemplated that the lock assembly can be removably coupled to the pocket assembly 100 with other structures, mechanisms and devices.

Referring again to FIG. 4, the second post 104 includes a threaded structure 114 configured to support a threaded rod 116. A first end of the threaded rod 116 is connected to a handle 118 and a second end is connected to a brace assembly 120. The threaded rod 116, handle 118 and brace assembly 120 are connected together such that rotation of the handle 118 results in rotation of the threaded rod 116 and axial movement of the brace assembly 120 in directions the away from and toward the threaded structure 114, as shown by direction arrow D1. In the illustrated embodiment, the threaded rod 116 has the form of an acme rod with a 1.0 inch diameter and the threaded structure 114 has the form of an acme nut with internal threads configured to receive the threaded rod 116. Alternately, the threaded rod 116 and the threaded structure can have other forms sufficient to affect movement of the brace assembly 120 in the directions indicated by direction arrow D1.

Referring again to FIG. 4, the brace assembly 120 includes a backing member 122 and a pad 124. The backing member 122 is configured for attachment to the threaded rod 116 such that rotation of the threaded rod 116 results in linear movement of the backing member 122. The backing member 122 is further configured to support the pad 124. As will be explained in more detail below, the pad 124 is configured to engage a rear portion of a dolly cart 20a-20e. In the illustrated embodiment, the backing member 122 has the form of a metallic plate and the pad 124 has the form of sheet polymeric material. However, in other embodiments, the backing member 122 and the pad 124 can have other desired forms and can be made from other desired materials sufficient to engage a rear portion of a dolly cart 20a-20e.

Figure 5:
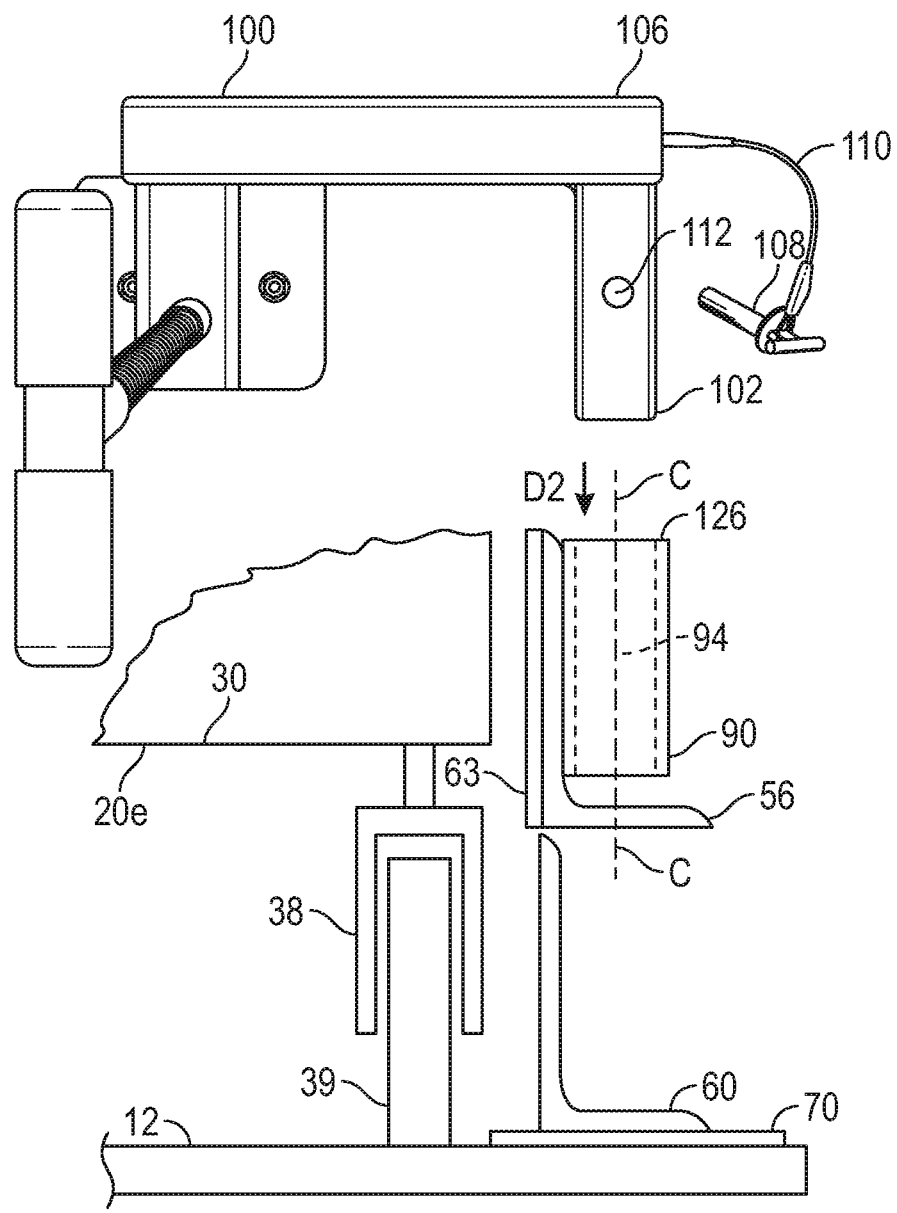
FIG. 5 is an exploded rear view of the pocket assembly and the lock assembly of the dolly cart rail and lock system of FIG. 1.

Referring now to FIG. 5, the assembly of the lock assembly 100 into the pocket assembly 90 is illustrated. The lock assembly 100 includes the first post 102 extending in a downward direction from the arm 106. The pocket assembly 90 includes the cavity 94 having the axis C-C arranged in a generally vertical direction. As indicated by direction arrow D2, the first post 102 is inserted into the cavity 94 until the arm 106 seats against a top surface 126 of the pocket assembly 90.

Figure 6:
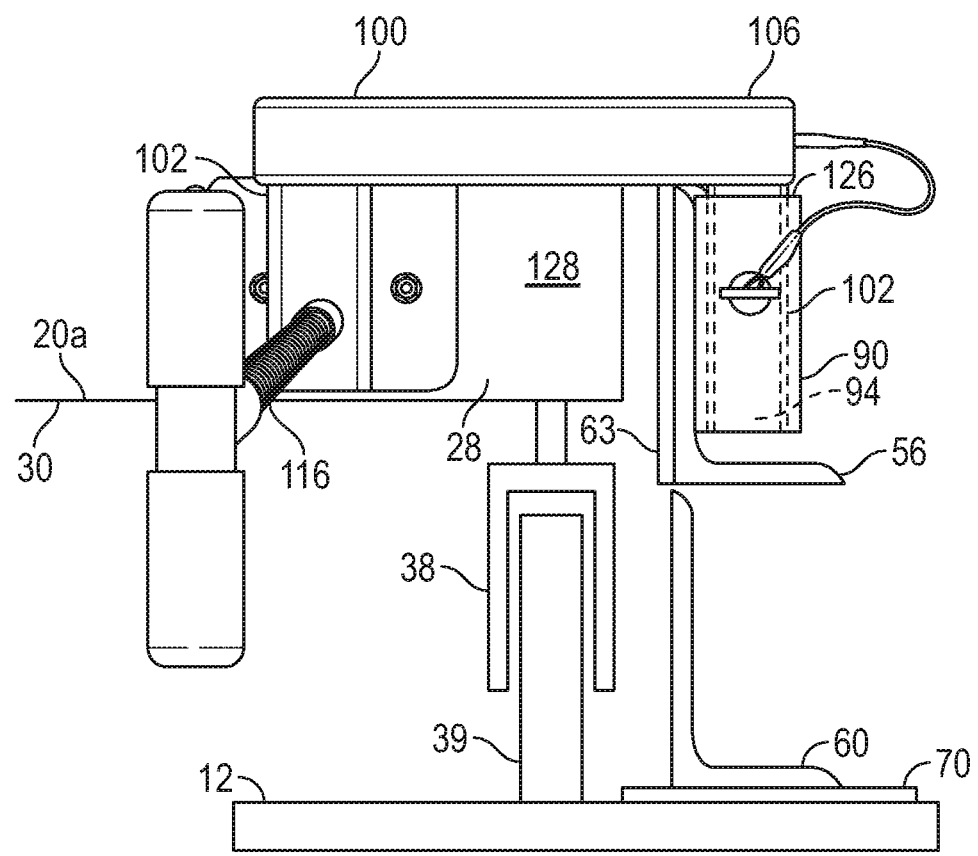
FIG. 6 is an assembled rear view of the pocket assembly and the lock assembly of the dolly cart rail and lock system of FIG. 1.

Referring now to FIG. 6, the assembled lock assembly 100 and pocket assembly 90 are illustrated. The first post 102 of the lock assembly 100 is seated within the cavity 94 of the pocket assembly 90 and the arm 106 of the lock assembly 100 extends is a direction toward the dolly cart 20e. The second post 102 of the lock assembly 100 extends in a downward direction and the threaded rod 116 extends from the second post 102 in a generally perpendicular direction. The brace assembly 120 is connected to the second end of the threaded rod 116 in a manner such that the pad 124 faces an outward surface 128 of the rear wall 18 of the dolly cart 20e.

Referring again to FIGS. 5 and 6, the first post 102 includes an aperture 112. With the lock assembly 100 in an installed position within the pocket assembly 90, the aperture 112 is configured to align with the aperture 96 of the pocket assembly, such that the pin 108 can be inserted therethrough.

Figure 7:
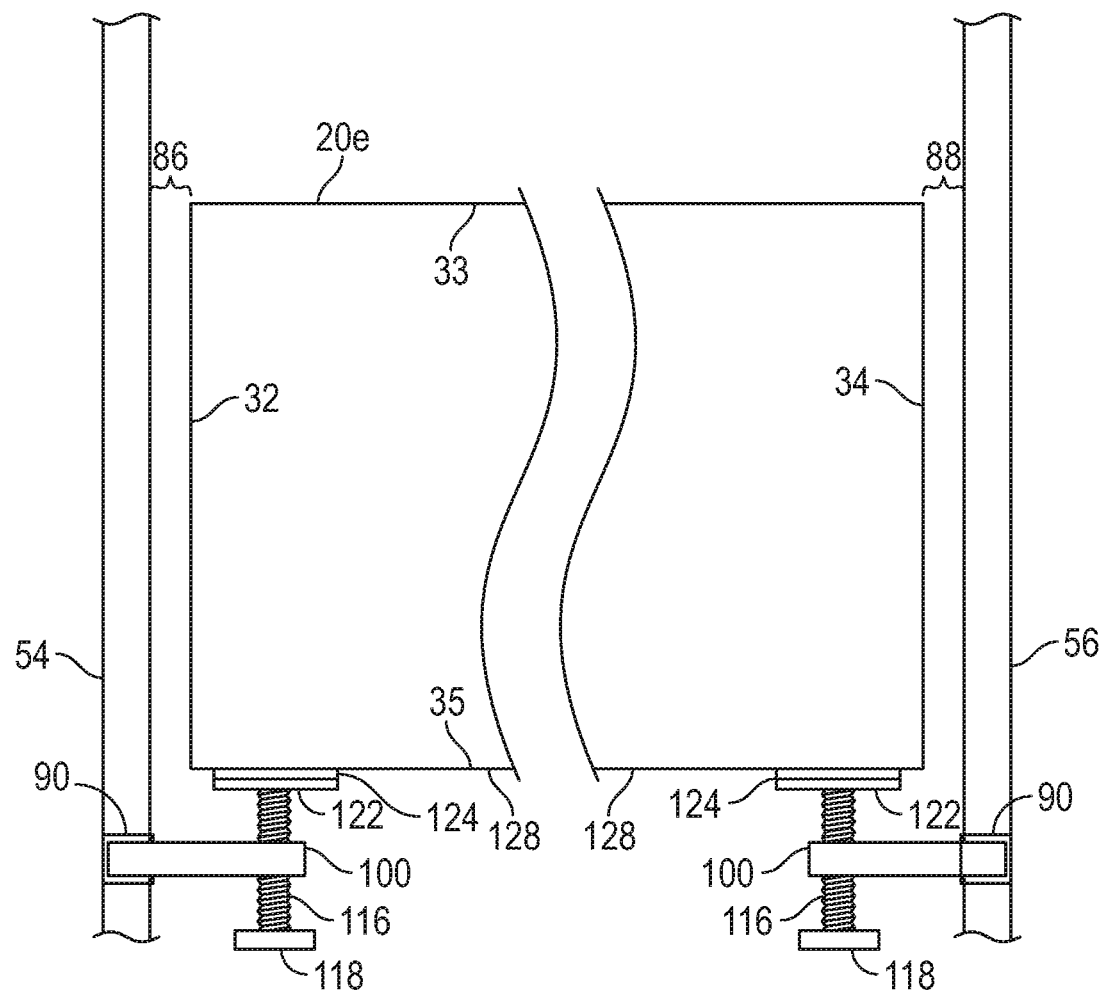
FIG. 7 is an assembled plan view of the pocket assembly and the lock assembly of the dolly cart rail and lock system of FIG. 1.

Referring now to FIG. 7, the dolly cart 20e is illustrated as disposed within the first and second upper rails 54, 56 and between the gaps 86, 88. The dolly cart 20e includes the sidewall 32, front wall 33, sidewall 34 and rear wall 35. A plurality of opposing lock assemblies 100 are seated within the pocket assemblies 90 in a manner described above. The threaded rods 116 are rotated by the handle 118 thereby advancing the brace assembly 120 until the pad 124 contacts the outward surface 128 of the rear wall 35 of the dolly cart 20e.

Referring again to FIG. 1, the dolly carts 20a-20e are arranged in a single file line. That is, the front wall 33 of a dolly cart is positioned next to the rear wall of an adjacent dolly cart and the aligned dolly carts extend from the front wall 12 of the platform 12 in a direction toward the rear of the platform 12. While the illustrated embodiment shows a quantity of five dolly carts 20a-20e, is should be understood that more or less than five dolly carts can be arranged in a single file line on the platform 12.

Referring again to FIGS. 1 and 7, the opposing lock assemblies 100 engage the most rearward of the dolly carts 20e and subsequently limit front-to-back movement of the most rearward of the dolly carts 20e. In this manner, advantageously the use of two lock assemblies 100, as applied to the most rearward of the dolly carts 20e, is configured to limit front-to-back movement of all of the dolly carts 20a-20e in the line of dolly carts. In another non-limiting example, in the event that the line of dolly carts includes a quantity of three dolly carts, the opposing lock assemblies 100 are only applied to the most rearward of the three dolly carts. Without being held to the theory, it is believed the close clearance of the first and second upper rails 54, 56 limits movement of the dolly carts in a side-to-side direction and the use of two opposing lock assemblies 110 applied to the most rearward of the dolly carts limits front-to-back movement of all of the dolly carts 20a-20e in the line of dolly carts.

While the embodiment illustrated in FIG. 4 shows the use of two opposing lock assemblies 100, it is within the contemplation of the dolly cart rail and lock system that a single lock assembly can be used in the manner described above.

While the embodiment illustrated in FIG. 1 is described above as a semi-trailer 10, it is within the contemplation of the dolly cart rail and lock system that the system can be applied to other modes of transport, such as the non-limiting examples of ships, planes, trains and the like.

The principle and mode of operation of the dolly cart rail and lock system have been explained and illustrated in its preferred embodiment. However, it must be understood that the dolly cart rail and lock system may be practiced otherwise than as specifically explained and illustrated without departing from its spirit or scope.

What is claimed is:

1. A dolly cart rail and lock system configured to secure one or more dolly carts within a vehicle, the dolly cart rail and lock system comprising:
   a first upper rail extending in a front-to-back direction connected to a platform of the vehicle and having a first end, the first upper rail having a vertical inner surface positioned external to a sidewall of the one or more dolly carts facing the vertical inner surface;
   a second upper rail extending in the front-to-back direction opposing the first upper rail and connected to the platform of the vehicle, the second upper rail having a first end, the second upper rail having a vertical inner surface positioned external to and facing an opposing sidewall of the one or more dolly carts;
   a bulkhead assembly connecting the first end of the first upper rail and the first end of the second upper rail;
   a plurality of spaced apart pocket assemblies attached to the first and second upper rails;
   at least one lock assembly connected to the pocket assemblies and configured to engage the dolly carts so as to limit movement of the dolly carts in the front-to-back direction.

2. The dolly cart rail and lock system of claim 1, wherein the vehicle is a truck configured with a semi-trailer.

3. The dolly cart rail and lock system of claim 1, wherein a first lock assembly is connected to the first upper rail and a second lock assembly is connected to the second upper rail, and wherein each of the first and second lock assemblies is configured to limit movement of the dolly carts in a front-to-back direction.

4. The dolly cart rail and lock system of claim 1, wherein the first upper rail is supported by a first lower rail.

5. The dolly cart rail and lock system of claim 1, wherein the vertical inner surfaces of the first and second upper rails are configured to restrain side-to-side movement of the dolly carts.

6. The dolly cart rail and lock system of claim 5, wherein gaps are formed between the inner surfaces of the first and second upper rails and the dolly carts, and wherein the gaps are in a range of from about 0.5 inches to about 2.0 inches.

7. The dolly cart rail and lock system of claim 5, wherein a distance between the inner surfaces of the opposing first and second upper rails is larger than a width of the dolly carts by a range of about 1.0 inches to about 4.0 inches.

8. The dolly cart rail and lock system of claim 1, wherein each lock assembly includes a first post configured for insertion into a cavity formed within each of the pocket assemblies.

9. The dolly cart rail and lock system of claim 8, wherein each lock assembly includes a second post configured to support a rotatable threaded rod.

10. The dolly cart rail and lock system of claim 9, wherein one end of the rotatable threaded rod is connected to a handle and the opposing end of the rotatable threaded rod is attached to a brace assembly.

11. The dolly cart rail and lock system of claim 10, wherein the brace assembly is configured such that rotation of the rotatable threaded rod results in axial movement of the brace assembly.

12. The dolly cart rail and lock system of claim 10, wherein the brace assembly includes a pad configured to engage a rear portion of a dolly cart.

13. The dolly cart rail and lock system of claim 1, wherein the one or more dolly carts are arranged within the dolly cart rail and lock system in a single file line.

14. The dolly cart rail and lock system of claim 1, wherein a flexible cable is configured to connect a pin to the lock assembly.

15. The dolly cart rail and lock system of claim 14, wherein the pin is configured for insertion into aligned apertures in the lock assembly and the pocket assembly.

16. The dolly cart rail and lock system of claim 1, wherein the first upper rail is supported by a first lower rail and the second upper rail is supported by a second lower rail, and wherein the first and second lower rails are attached to a base assembly, the base assembly configured to seat against the platform.

17. The dolly cart rail and lock system of claim 16, wherein the base assembly includes a support member attached to a structural member of the vehicle.

18. A vehicle equipped with a dolly cart rail and lock system configured to secure one or more dolly carts within the vehicle, the vehicle comprising:
   a platform configured to receive a plurality of movable dolly carts, the platform having a front end and a rear end;
   a first upper rail extending in a front-to-back direction connected to the platform and having a first end, the first upper rail having a vertical inner surface positioned external to a sidewall of the one or more dolly carts facing the vertical inner surface;
   a second upper rail extending in the front-to-back direction opposing the first upper rail and connected to the platform, the second upper rail having a first end and a vertical inner surface positioned external to and facing an opposing sidewall of the one or more dolly carts;
   a bulkhead assembly connecting the first end of the first upper rail and the first end of the second upper rail;
   a plurality of spaced apart pocket assemblies attached to the first and second upper rails;
   at least one lock assembly connected to the pocket assemblies and configured to engage the dolly cart so as to limit movement of the dolly carts in the front-to-back direction.

19. The vehicle of claim 18, wherein the vehicle is a truck configured with a semi-trailer.

20. The vehicle of claim 18, wherein each of the dolly carts forming the plurality of movable dolly carts are arranged within the dolly cart rail and lock system in a single file line.

* * * * *